June 7, 1927.
G. O. HOFFSTETTER
1,631,682
MEASURING DEVICE
Filed Nov. 28, 1925
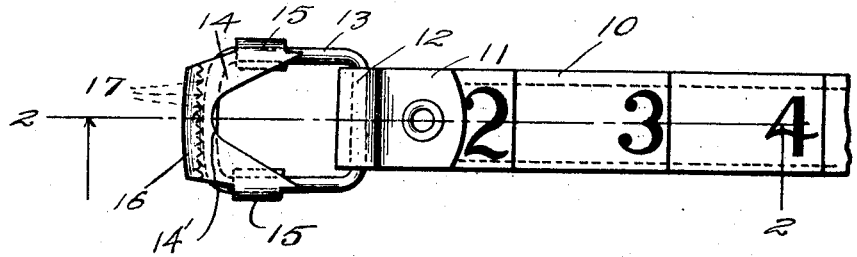
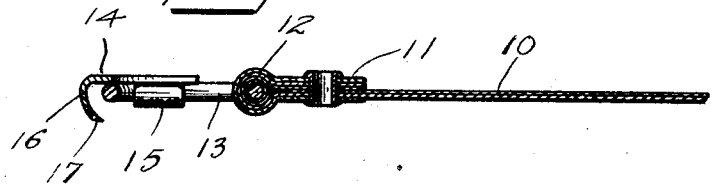
Inventor
G. O. Hoffstetter
Attorney Patented June 7, 1927.

1,631,682

UNITED STATES PATENT OFFICE.

GEORGE O. HOFFSTETTER, OF FIDELITY, ILLINOIS.

MEASURING DEVICE.

Application filed November 28, 1925. Serial No. 71,987.

This invention relates to new and useful improvements in measuring devices, and particularly to measuring tapes.

Great difficulty is usually experienced when one person desires to use a long tape measure, by reason of the fact that no means are ordinarily provided for holding the outer end of the tape, while the operator moves to the other end of the line or space to be measured.

The principal object of the present invention is to provide a tape measure which is equipped with means for anchoring the outer end of the tape, while the operator moves to another point, and whereby such tape end will be firmly held in place, thus permitting a single person to measure long distances, unassisted.

Other objects and advantages will be apparent from the following description when taken in connection with the accompanying drawing.

In the drawing:

Figure 1 is a plan view of an end of a tape line, showing the invention applied thereto.

Figure 2 is a sectional view on the line 2—2 of Figure 1.

Referring particularly to the accompanying drawing, 10 represents a portion of a tape line, which is equipped with a terminal clip 11, having the transverse tubular eye 12. Engaged loosely in this tubular eye 12 is one end of a rectangular frame 13. A metal plate 14 is disposed across the outer portion of this frame 13 and has the lateral tabs 15 rolled into embracing engagement with two opposite sides of the frame, while the outer end of said plate projects beyond the outer side member of the frame, where it is curved inwardly across said end portion of the frame, as at 16, and formed with serrations 17. The inner end of the plate 14 is formed with a V-shaped recess 14', permitting full view of the adjacent end of the tape, and also providing an opening whereby the device may be engaged on a nail. Furthermore, access is more easily had to the serrations 17, for the purpose of sharpening the same.

The serrated portion 16, of the metal plate is spaced from the frame, and is adapted to be engaged with any stationary object, while the operator moves to another point along the line to be measured. Thus the end of the tape is firmly held, and one person enabled to perform the measuring operation, alone. Ordinarily one person holds the end of the tape while another person unwinds the tape, and moves to a point at a distance from the first person. The need for the first person is obviated, and the work done by one person.

The device is extremely simple in construction, and can be readily attached to the end of any tape line, without radical modifications to the line, other than securing the metal clip to the tape end.

It is to be further noted that the hook member is secured to the end of the tape at such a point that the entire end of the tape is in full view. Also, the hook member is easily accessible for sharpening the bills thereof.

What is claimed is:

As an article of manufacture, an attachment for the terminal ring of a tape measure comprising a plate having a substantially V-shaped recess in one end, laterally extending tubular portions at the sides of the plate, and a transversely extending and angularly disposed toothed portion on the other end of the plate.

In testimony whereof, I affix my signature.

GEORGE O. HOFFSTETTER.